(12) United States Patent
Hwang et al.

(10) Patent No.: US 10,740,043 B2
(45) Date of Patent: Aug. 11, 2020

(54) PRINT NOTIFICATIONS BASED ON CONTEXT DATA

(71) Applicant: Hewlett-Packard Development Company, L.P., Houston, TX (US)

(72) Inventors: Peter G. Hwang, Vancouver, WA (US); Phillip A. McCoog, Vancouver, WA (US); Michael St Laurent, Baden (CA)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/937,724

(22) Filed: Mar. 27, 2018

(65) Prior Publication Data
US 2019/0303051 A1    Oct. 3, 2019

(51) Int. Cl.
*G06F 3/12* (2006.01)
*H04W 4/021* (2018.01)

(52) U.S. Cl.
CPC .......... *G06F 3/1203* (2013.01); *G06F 3/1222* (2013.01); *G06F 3/1226* (2013.01); *G06F 3/1238* (2013.01); *G06F 3/1267* (2013.01); *G06F 3/1292* (2013.01); *H04W 4/021* (2013.01)

(58) Field of Classification Search
CPC .................................................... G06F 3/1292
See application file for complete search history.

(56) References Cited

U.S. PATENT DOCUMENTS

| | | | |
|---|---|---|---|
| 9,727,284 B2 | 8/2017 | Ohhashi | |
| 9,753,684 B1 | 9/2017 | Najari et al. | |
| 9,804,811 B2 | 10/2017 | Wong | |
| 9,807,258 B1 | 10/2017 | Lim et al. | |
| 2009/0009802 A1* | 1/2009 | Shaw | G06F 21/608 358/1.15 |
| 2009/0322521 A1* | 12/2009 | Jacobson | H04L 63/102 340/540 |
| 2013/0141753 A1* | 6/2013 | Kamoi | G06F 3/1231 358/1.14 |
| 2013/0321856 A1* | 12/2013 | Bell | G06F 3/122 358/1.15 |
| 2014/0022587 A1* | 1/2014 | Coccia | G01S 19/14 358/1.15 |

(Continued)

*Primary Examiner* — Nicholas Pachol
(74) *Attorney, Agent, or Firm* — HP Inc. Patent Department (57) ABSTRACT

An example of an apparatus includes a network interface to receive print data associated with a user from a first computing device and to receive context data from a second computing device, the second computing device associated with the user, and wherein context data includes a beacon identifier and a global positioning system (GPS) coordinate. The apparatus includes a memory storage unit to store the print and context data, wherein the memory storage unit includes a database of printing devices. The apparatus includes a processor to select a printing device from the database of printing devices, the printing device associated with the beacon identifier and a predefined area, wherein the predefined area includes the GPS coordinate. The apparatus includes a print engine to generate a notification for the second computing device, wherein the notification prompts the user for a command to send the print data to the printing device.

14 Claims, 5 Drawing Sheets

(56) References Cited

U.S. PATENT DOCUMENTS

| | | | |
|---|---|---|---|
| 2014/0085663 A1* | 3/2014 | Kavanappillil | H04N 1/00342 358/1.15 |
| 2014/0368859 A1* | 12/2014 | Gutnik | G06F 3/1206 358/1.14 |
| 2014/0368865 A1* | 12/2014 | Gutnik | G06F 3/1222 358/1.15 |
| 2015/0304484 A1* | 10/2015 | Halmstad | H04M 1/72577 455/419 |
| 2016/0077778 A1 | 3/2016 | Aritomi | |
| 2016/0171486 A1* | 6/2016 | Wagner | G06Q 20/12 705/39 |
| 2017/0039007 A1* | 2/2017 | Nathani | G06F 3/1222 |
| 2017/0076306 A1* | 3/2017 | Snider | H04W 4/02 |
| 2017/0180606 A1 | 6/2017 | Zehler et al. | |
| 2017/0230536 A1 | 8/2017 | Haapanen et al. | |
| 2017/0262243 A1* | 9/2017 | Najari | H04W 4/04 |
| 2017/0262739 A1* | 9/2017 | Lehotsky | G06F 3/1203 |
| 2017/0265027 A1* | 9/2017 | Najari | H04W 4/02 |
| 2017/0286036 A1* | 10/2017 | Wong | G06F 3/1292 |
| 2018/0109908 A1* | 4/2018 | Swanson | H04W 4/80 |

\* cited by examiner

PRINT NOTIFICATIONS BASED ON CONTEXT DATA

BACKGROUND

Printed documents are often used to present information. In particular, printed documents continue to be used despite the availability of electronic alternatives as they are more easily handled and read by users. Accordingly, the generation of printed documents remains an important tool for the presentation and handling of information. Printers are known and have been used to generate documents based on information received via a network.

BRIEF DESCRIPTION OF THE DRAWINGS

Reference will now be made, by way of example only, to the accompanying drawings in which.

DETAILED DESCRIPTION

Printed documents may be widely accepted and may often be more convenient to use. In particular, printed documents are easy to distribute, store, and be used as a medium to disseminate information. In addition, printed documents may serve as contingency for electronically stored documents, such as may happen when an electronic device fails, such as with a poor data connection for downloading the document and/or a depleted power source. When printing documents, documents are often generated at a printing device based on data received from a computing device. If the user generating the document is not in the vicinity of the printing device, the document may be generated and left at the printing device until collected by the user. It is to be appreciated that this may present a security problem as the document is left unattended for a period of time. This may be especially a concern in an environment where multiple printing devices are provided such that a document may be generated by a printing device in error and the document never picked up by the user.

A solution to address the security concern is to implement pull printing where a print job is held in a print queue until a user is physically present at the printing device where the document is to be generated. Once at the printing device, the user may be authenticated with various means, such as by entering a personal identification number into the printing device, a username and password, or with an identification card, badge, or biometric authentication method. Upon authentication, the print job is retrieved or "pulled" from the print queue and the document is generated by the printing device. Although pull printing provides additional security to reduce the likelihood of a document to be obtained by an unauthorized party, pull printing may be an impediment to productivity as users spend additional time authenticating as well as waiting for the document to be generated by the printing device.

Figure 1:
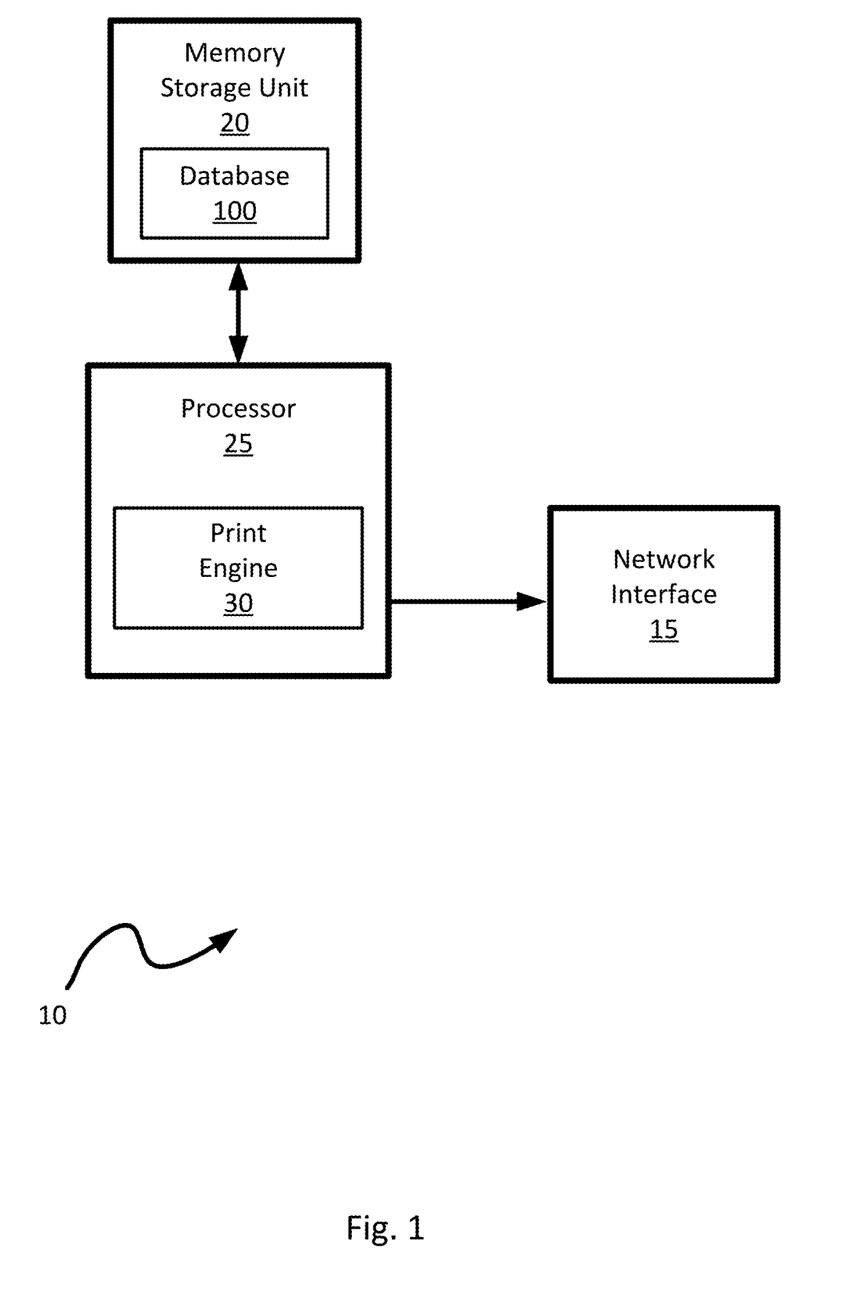
FIG. 1 is a block diagram of an example apparatus to handle print jobs across a network and generate print notifications based on context data.

Referring to FIG. 1, an apparatus to handle print jobs across a network is shown at 10. The apparatus 10 may include additional components, such as various additional interfaces and/or input/output devices such as displays to interact with a user or an administrator of the apparatus 10. The apparatus 10 is to receive a print job from the network, such as from a portable computing device, and to transmit the print job to a printing device. In the present example, the apparatus 10 includes a network interface 15, a memory storage unit 20, and a processor 25. The processor 25 may be to operate a print engine 30 as well as carry out a set of instructions associated with an operating system.

The network interface 15 is to communicate with a network such as a wired or wireless network which may include a cellular network. In the present example, the network interface 15 is to receive print data, which may represent a print job, and context data via the network. The print data and the context data are associated with a user of a portable computing device. In the present example, the print data may be generated at a computing device associated with the portable computing device. In this example, the computing device may be a workstation or personal computer of a user. The user may then own a portable computing device, such as a smartphone, that is generally carried on the person. In this example, it is to be appreciated that the user may work on a computing device, such as a workstation, to generate print data representing documents to print at a printing device located away from the computing device that generated the print data. Separately, the portable computing device generates context data that is associated with the portable computing device.

The context data may be provided by the portable computing device and may provide information such as the location of a user. In this example, it is understood that the context data includes data received at the portable computing device such as a beacon identifier and a global positioning system (GPS) coordinate. Accordingly, the context data may change over time as the user moves portable computing device about an environment. For example, the context data may be updated periodically. For example, the portable computing device may be capable of communication with locating devices such as a Bluetooth Low Energy beacon. In another example, the context data may also include a network identifier, such as the identifier of the secure network, to indicate that the portable computing device is connected to a secure network. In other examples, the context data may also include other information about a user such as a security clearance level or an authorization period for a specific network. Context data may also include the time of day, business hours, calendar information from the portable computing device, and security metadata associated with the print data.

The memory storage unit 20 is coupled to the processor 25 and may include a non-transitory machine-readable storage medium that may be any electronic, magnetic, optical, or other physical storage device. In the present example, the memory storage unit 20 stores the print data received at the network interface 15 as well as the context data received at the network interface 15.

The non-transitory machine-readable storage medium may include, for example, random access memory (RAM), electrically-erasable programmable read-only memory (EEPROM), flash memory, a storage drive, an optical disc, and the like. The memory storage unit 20 may also be encoded with executable instructions to operate the network interface 15 and other hardware in communication with the processor 25. In other examples, it is to be appreciated that the memory storage unit 20 may be substituted with a cloud-based storage system.

The memory storage unit 20 may also store an operating system that is executable by the processor 25 to provide general functionality to the apparatus 10, for example, functionality to support various applications such as a user interface to access various features of the apparatus 10. Examples of operating systems include Windows™, macOS™, iOS™, Android™, Linux™, and Unix™. The memory storage unit 20 may additionally store applications that are executable by the processor 25 to provide specific functionality to the apparatus 10, such as those described in greater detail below.

The memory storage unit 20 also includes a database 100 to store information relating to a plurality of printing devices. For example, the database 100 may include a list of the printing devices aggregated by the processor along with an identifier for each printing device, such as a media access control address, as well as characteristics of each printing device, such as duplex capabilities, color printing capabilities, and other finishing options. In addition, the database 100 may include information on the location of the printing device and whether the printing device may be part of a secure network. Other data included in the database 100 may be additional characteristics of the printing device, such as printing speed, duty cycle, paper capacity, amount of paper, amount of ink, current print queue status, cost per page, number of pages left on a contract, and device ownership.

The memory storage unit 20 may also store additional executable instructions for the operation of the apparatus 10. In the present example, the executable instructions may include a set of instructions for the processor 25 to run in order to operate the print engine 30.

The processor 25 may include a central processing unit (CPU), a microcontroller, a microprocessor, a processing core, a field-programmable gate array (FPGA), or similar. The processor 25 and memory storage unit 20 may cooperate to execute various instructions. The processor 25 maintains and operates a print engine 30 to generate a notification for the portable computing device. In the present example, the notification prompts the user to provide a command to release a print job to the printing device as discussed in greater detail below.

In addition, the print engine may be to generate print data to print at a printing device. In an example, the print engine 30 routes the print job to the printing device when the printing device upon receiving a command from a user of the portable computing device. In other examples, the command may be automatically generated when a direct connection between the portable computing device and the printing device, such as via a Bluetooth connection with a beacon, to indicate that the user is close enough to the printing device to collect the document after it is generated.

Accordingly, the processor 25 may execute instructions stored on the memory storage unit 20 to implement the print engine 30 and to handle and manage the print jobs across a network. It is to be appreciated that in other examples, the print engine 30 may be substituted with an external engine, such as another server or machine, or carried out by a virtual machine in the cloud.

The processor 25 is also to control the network interface 15. In particular, the processor 25 may send instructions to the network interface 15 to receive the print data and the context data. For example, the processor 25 is to monitor the context data received that is associated with the portable computing device. In particular, the processor 25 may periodically send requests to the portable computing device to request an update for the context data. In other examples, the portable computing device may automatically send updates in the context data to the apparatus 10. It is to be appreciated that such examples may reduce the amount of data transmitted between the portable computing device to conserve energy and prolong battery life.

Figure 2:
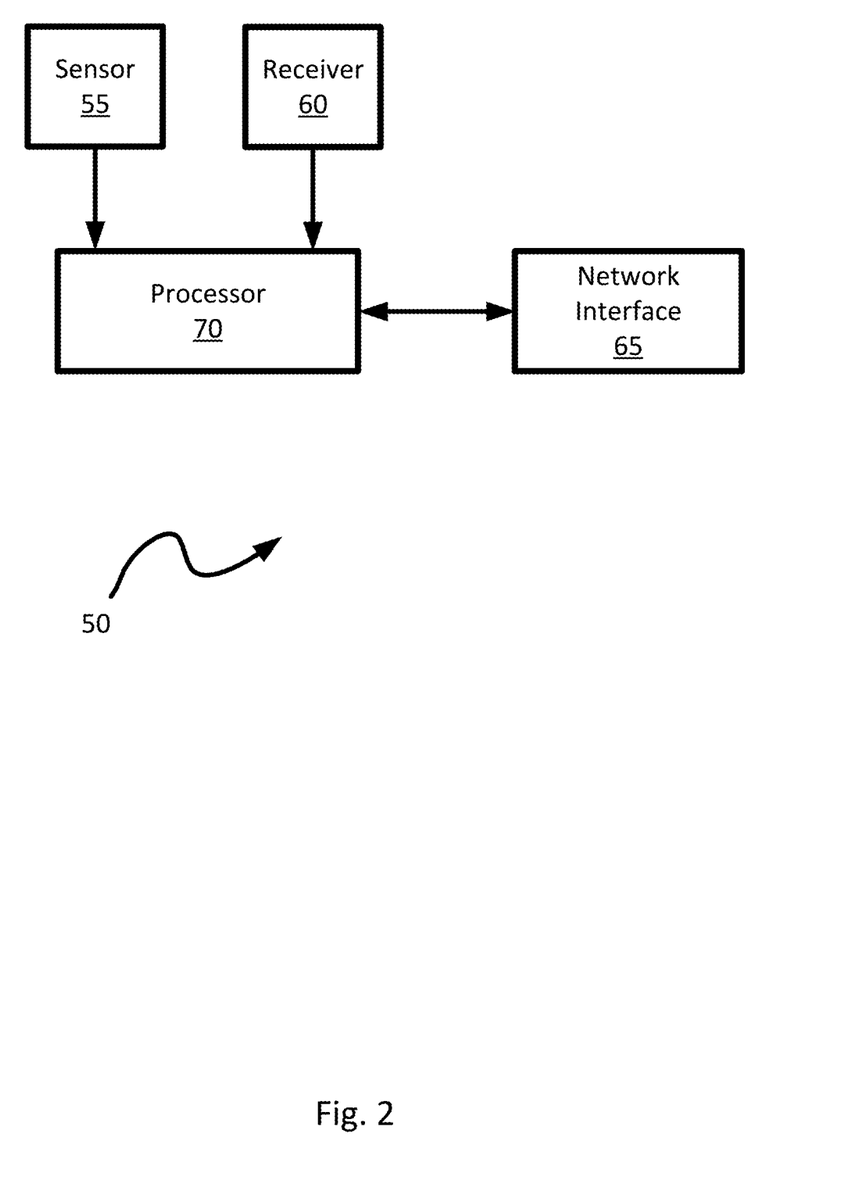
FIG. 2 is a block diagram of an example apparatus to receive print notifications.

In other examples, the sensor 55 may be generally powered off until the portable computing device enters a geolocation that includes a plurality of beacons that may be detected by the sensor 55. Accordingly, such an example will generate context data with only GPS coordinates when in a geolocation without beacons, such as away from an office building or residence. Upon entering a geolocation with beacons, the apparatus 10 may send a command to the portable computing device to activate the sensor 55.

Accordingly, the portable computing device may only send updated context data when a substantial change such as a large change in location or if the portable computing device connects with a different network. It is to be appreciated that the threshold for what may be considered a substantial change is not particularly limited and may be set based on various factors.

The processor 25 is also to select a printing device from the database 100 of printing devices based on the context data received from the portable computing device via the network interface 15. In particular, the processor 25 selects a printer or printing device within a predefined area which includes a GPS coordinate measured at the portable computing device. Furthermore, it is to be appreciated that the selection of the printer also considers the beacon identifier measured at the portable computing device. The manner by which the processor 25 selects the printing device is not limited and may include analyzing the context data, such as location data, to determine the nearest printing device to the location of the portable computing device. In some examples, the processor 25 may delay the selection of the printing device until the portable computing device is within a threshold distance of a printing device. In cases where the portable computing device is within the threshold distance of more than one printing device, the processor 25 may generate a notification to present a list of the aggregated printing devices on a user interface of the portable computing device such that the user may provide input via the portable computing device. In other examples, the processor may further evaluate the context data to make a selection from the list. For example, the context data may include a preferred printing device. In another example, the context data may include behavior patterns of the user or determine a direction the user is moving to select a printing device that is on route and requiring a smaller detour. In this example, if a user is walking from his office to a meeting room, the processor 25 will select a printing device closest to the walking route between the office and the meeting room such that the user makes the smaller detour. As another example, the selection may be made based on a determination if where the printing device, the computing device and the portable computing device are connected to the same local area network to indicate a secure connection. The GPS coordinate in the context data may also be used to identify secure locations or to confirm that the networks to which the portable computing device is correct.

Referring to FIG. 2, a portable computing device is shown at 50. The portable computing device 50 may include additional components, such as various additional interfaces and/or input/output devices such as displays to interact with a user of the portable computing device 50. The portable computing device 50 is to provide context data about a user, such as the users location. Accordingly, it is to be assumed that the portable computing device is generally carried by the user at all times. For example, the portable computing device may be a smartphone or a wearable device such as a smartwatch. In the present example, the portable computing device 50 includes a sensor 55 to detect signals, a receiver 60 to receive GPS data, a network interface 65, and a processor 70.

The sensor 55 is not particularly limited and is to detect a signal. In particular, the sensor 55 is to detect a beacon identifier to identify the location of the beacon. As an example of implementation of a printing system, a plurality of beacons may be positioned within a space, such as an office building. In the present example, each beacon may be may be disposed through the space and emit a signal with a unique beacon identifier. The sensor 55 may receive the signal and the identifier. The signals received by the sensor 55 is not particularly limited and may include a Bluetooth low energy signal, Wi-Fi, near field communication, radio waves, and GPS location data indicating geo-fence or geo-proximity.

The receiver 60 is also not particularly limited and is to determine a GPS coordinate based on GPS data.

The network interface 65 is to communicate with a network such as a wireless network which may include a cellular network or a local network, such as a Wi-Fi network. In the present example, the network interface 65 is to transmit the context data to the apparatus 10, which may be a print server. In addition, the network interface 65 may be to receive a notification from the apparatus 10. In the present example, the notification prompts the user for a command to proceed with printing. For example, the notification may prompt the user to press a button that sends a command back to the apparatus 10 to cause the print data to be sent from the apparatus 10 to the printing device associated with the context data provided by the portable computing device 50.

The processor 70 may include a central processing unit (CPU), a microcontroller, a microprocessor, a processing core, a field-programmable gate array (FPGA), or similar. The processor 70 may be to execute various instructions. In the present example, the processor 70 is to generate context data based on input received via the sensor 55 and the receiver 60. In some examples, the processor 70 may execute instructions to handle and manage the print jobs across a network.

The processor 70 is also to control the network interface 65. In particular, the processor 70 may send instructions to the network interface 65 to receive the context data, notification, and commands. For example, the processor 70 is to monitor the context data received that is associated with the portable computing device 50. In particular, the processor 70 may periodically send data to the apparatus to update the context data. In other examples, the portable computing device 50 may automatically send updates when they occur to the apparatus 10. It is to be appreciated that such examples may reduce the amount of data transmitted between the portable computing device 50 to conserve energy and prolong battery life. Accordingly, the portable computing device 50 may only send updated context data when a substantial change such as a large change in location or if the portable computing device 50 connects with a different network. It is to be appreciated that the threshold for what may be considered a substantial change is not particularly limited and may be set based on various factors.

Figure 3:
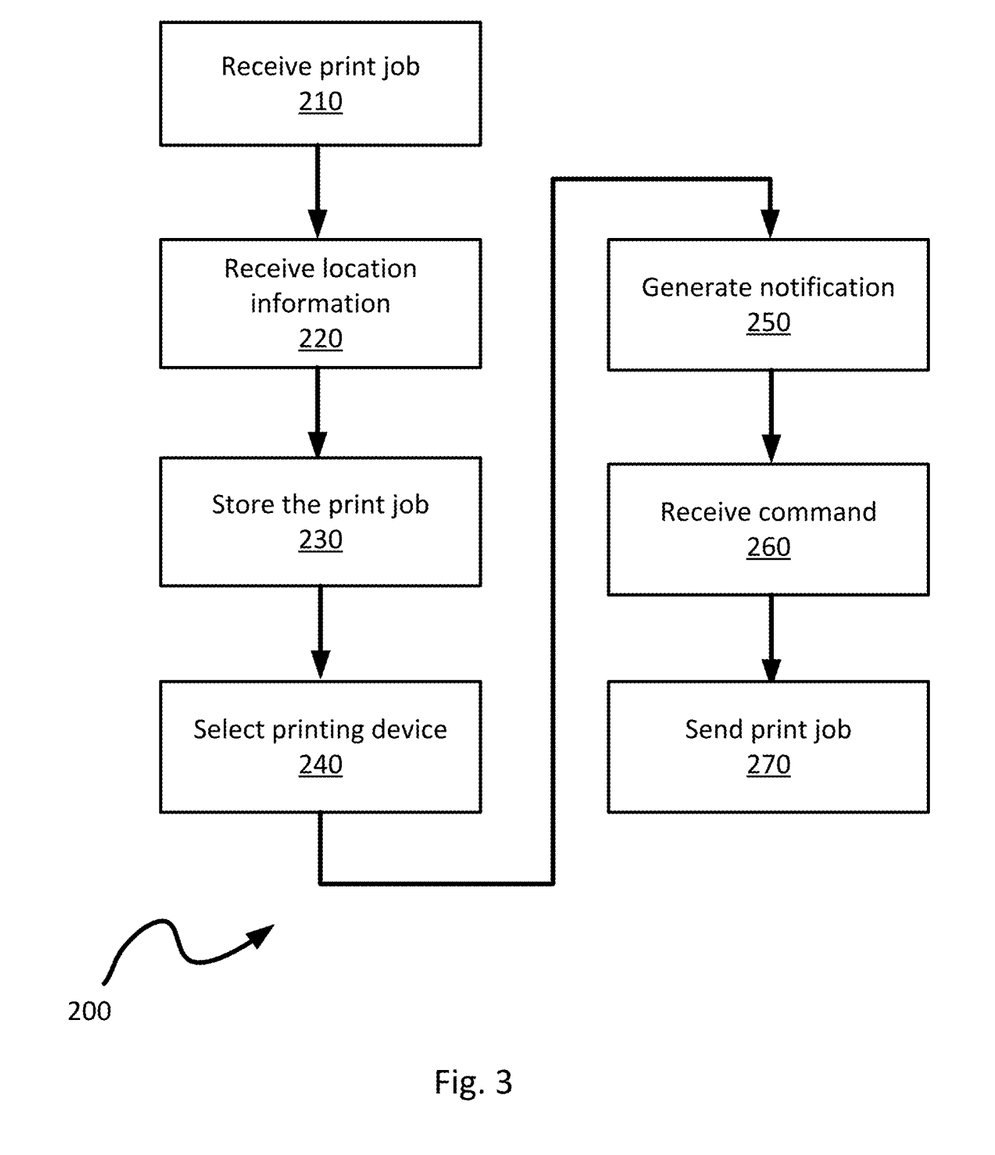
FIG. 3 is a flowchart of an example of a method to process print notifications based on context data.

Referring to FIG. 2, a flowchart of a method to handle print jobs across a network is shown at 200. In order to assist in the explanation of method 200, it will be assumed that method 200 may be performed with the apparatus 10, and specifically by the processor 25. Indeed, the method 200 may be one way in which apparatus 10 may be configured to interact with the portable computing device 50. Furthermore, the following discussion of method 200 may lead to a further understanding of the processor 25, and apparatus 10 and its various components. Furthermore, it is to be emphasized, that method 200 may not be performed in the exact sequence as shown, and various blocks may be performed in parallel rather than in sequence, or in a different sequence altogether.

Beginning at block 210, the processor 25 receives a print job from a computing device via the network interface 15. In this example, the computing device is a workstation or personal computer on which a user generates the print data from a document or image. In other examples, the computing device may be portable, such as the portable computing device 50, or a document generation engine automatically generating print data for printing, such as invoices. The manner by which the print job is received from the computing device is not particularly limited. In the present example, the network interface 15 may receive print data from a network containing the print job.

At block 220, the processor 25 receives location information from the portable computing device 50 via the network interface 15. The manner by which the location information is received from the portable computing device 50 is not particularly limited. In the present example, the network interface 15 may receive context data which includes a beacon identifier and a GPS coordinate.

Block 230 involves the processor 25 to store the print job received at block 210 in the memory storage unit 20. The manner by which the print job is stored by the processor 25 is not particularly limited. For example, the print job may be stored in a database or queue of the memory storage unit 20. It is to be appreciated that that processor 25 may receive multiple print jobs from multiple computing devices that may be associated with different user accounts. For example, if the apparatus 10 is a print server, the apparatus 10 may be used to collect all print jobs and manage sending the print jobs to various printing devices for generating documents. Therefore, the memory storage unit 20 may include multiple databases and queues to organize the print jobs that are received via the network.

Next, block 240 involves the selection of a printing device for the print job. The printing device is to be selected from a database 100 of printing devices stored on the memory storage unit 20. In the present example, the selection is carried out by the processor 25 based on location data received from a portable computing device 50 at block 220, which is different from the computing device from which the print job originated. Accordingly, in this example, the print job is received at the processor 25 from one computing device and the location data is received separately from the portable computing device 50.

In most situations, it is to be understood that the first computing device from which the print job is received may be a workstation or personal computer on which a user performs the majority of work. For example, the user may prepare a document in a word processing program and upon completion of the preparation document, send the document for printing. The user also carries the portable computing device 50, such as a smartphone. When the portable computing device 50 approaches a printing device, location data is provided to the processor 25 from the portable computing device 50. In other examples, additional locating devices (not shown) may be used to detect the portable computing device 50. The processor 25 may then selected the nearest printing device to the portable computing device 50 and selected that printing device.

In some examples, such as when the portable computing device 50 is not close to any printing device, the processor 25 may delay the selection of the printing device until the portable computing device 50 moves within a threshold distance or a predetermined range of a printing device, such as about 15 to 20 feet in a high security environment. In other environments, the range may be increased or decreased to achieve a desired level of security. In some examples, the threshold distance may be dependent on other facts, such as document size, printing device characteristics like printing speed, and/or the speed at which the portable computing device is approaching the printing device. In examples with a variable threshold distances, the apparatus may be tuned such that the user arrives at the printing device as the document printing is completed.

Block 250 involves the generation of a notification by the processor 25. In the present example, the notification is a message to sent to the portable computing device 50 to inform the user of the portable computing device 50 that a printing device is nearby. In addition, the notification will cause the portable computing device 50 to generate a prompt to the user for a command, such as a command to send the print data stored in the memory storage unit 20 to the printing device.

At block 260, the processor 25 receives a command from the portable computing device 50 via the network interface 15. In the present example, the command directs the apparatus 10 to release the print job to the printing device selected at block 240, which is carried out at block 270.

Figure 4:
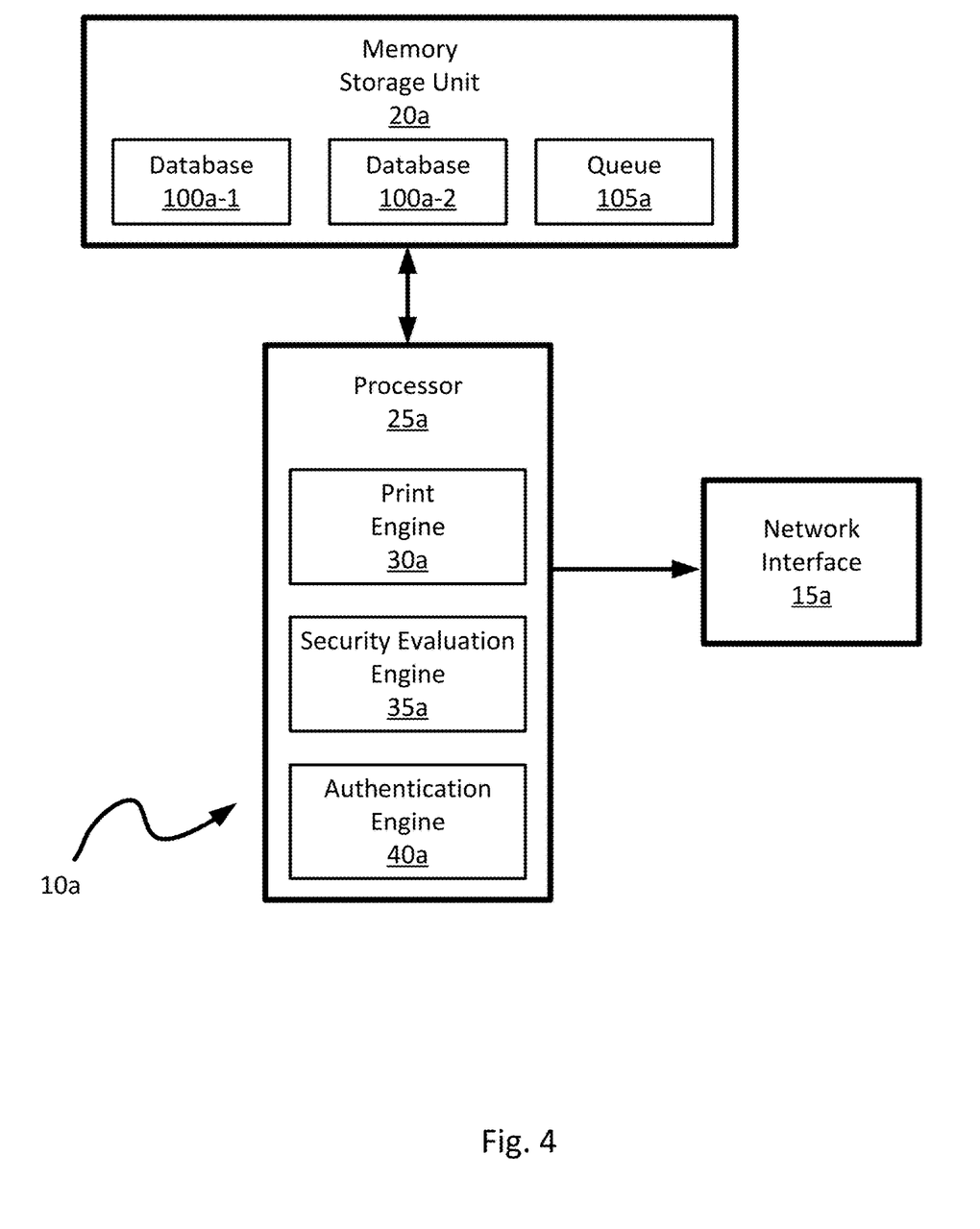
FIG. 4 is a block diagram of another example apparatus to handle print jobs across a network.

Referring to FIG. 4, another example of an apparatus to handle print jobs across a network is shown at 10a. Like components of the apparatus 10a bear like reference to their counterparts in the apparatus 10, except followed by the suffix "a". The apparatus 10a includes a network interface 15a, a memory storage unit 20a, and a processor 25a. The processor 25a may be to operate a print engine 30a, security evaluation engine 35a, and an authentication engine 40a as well as carry out a set of instructions to operate the apparatus 10a in general. In addition, the apparatus 10a may be connected to the portable computing device 50. Accordingly, the apparatus 10a is another example that may be used to carry out the method 200 and the portable computing device 50.

The network interface 15a is to communicate with a network, such as a wireless network, to receive a print job from a computing device. In the present example, the computing device is not particularly limited and may be a laptop, smartphone, smartwatch, computer, tablet, or other electronic device capable of generating print jobs. The network interface 15a is also to communicate and receive context data from the portable computing device 50.

The memory storage unit 20a is coupled to the processor 25a and may include a non-transitory machine-readable storage medium that may be any electronic, magnetic, optical, or other physical storage device. In the present example, the memory storage unit 20a stores the print data received at the network interface 15a from the portable computing device.

The non-transitory machine-readable storage medium may include, for example, random access memory (RAM), electrically-erasable programmable read-only memory (EEPROM), flash memory, a storage drive, an optical disc, and the like. The memory storage unit 20a may also be encoded with executable instructions to operate the network interface 15a and other hardware, such as various input and output devices like a monitor, keyboard or pointing device to allow a user or administrator to operate the apparatus 10a.

The memory storage unit 20a may also store an operating system that is executable by the processor 25a to provide general functionality to the apparatus 10a, for example, functionality to support various applications such as a user interface to access various features of the apparatus 10a. Examples of operating systems include Windows™, macOS™, iOS™, Android™, Linux™, and Unix™. The memory storage unit 20a may additionally store applications that are executable by the processor 25a to provide specific functionality to the apparatus 10a.

In the present example, the memory storage unit 20a includes databases 100a-1 and 100a-2 (generically, these databases are referred to herein as "database 100a" and collectively they are referred to as "databases 100a", this nomenclature is used elsewhere in this description). The database 100a-1 may be to store information relating to a plurality of printing devices. For example, the database 100a-1 may include a list of the printing devices along with an identifier for each printing device, such as a media access control address, as well as characteristics of each printing device, such as duplex capabilities, color printing capabilities, geolocation of the printing device, and other finishing options. In addition, the database 100a-1 may include information on the location of the printing device and whether the printing device may be considered to be part of a secure network. The database 100a-2 may be to store information relating to an account of a user. For example, the database 100a-2 may include context data such as preferences associated with the user of the portable computing device, such as a preferred printing device. Other data that may be stored in the database 100a-2 may include behavior characteristics of the user such as work hours, job classification and duties, user assignments and projects, and/or whether a user has special accessibility considerations. It is to be appreciated that the context data stored in the database 100a-2 may be used by the processor 25a to select the printing device to which the print job is to be sent as well as to determine whether the link between the printing device and the portable computing device is secure. For example, if the portable computing device provides a print job outside of working hours associated with the user of the portable computing device, the processor 25a may determine that the printing device and the portable computing device no longer form a secure link since the user may not have access to the printing device.

The memory storage unit 20a may also store and maintain a print queue 105a. In the present example, the print queue 105a may be to store print jobs received via the network interface 15a. The print queue 105a is not particularly limited and may include multiple queues for multiple printing devices. In the present example, the print queue 105a may be used to store the print jobs when the link between the portable computing device and the printing device is not secure for subsequent pull printing.

Although the present example illustrates two databases 100a and a single print queue 105a, it is to be appreciated that the memory storage unit 20a is not particularly limited and that additional databases 100a may be maintained to store additional data. For example, an organization may have printing devices connected via various networks which may have different levels of security protocols. Accordingly, each group of printing devices connected to a single network may have information stored in a separate database 100a.

Similarly, multiple queues 105a may be provide such that each printing device is associated with a single print queue 105a.

The processor 25a may include a central processing unit (CPU), a microcontroller, a microprocessor, a processing core, a field-programmable gate array (FPGA), or similar. The processor 25a and memory storage unit 20a may cooperate to execute various instructions. In this example, the processor 25a also maintains and operates a security evaluation engine 35a to determine if the link between the portable computing device and the printing device is secure.

The processor 25a also maintains and operates a print engine 30a to route a print job generated from the print data to a printing device. In the present example, the print engine 30a automatically routes the print job to the printing device when the printing device and the portable computing device are connected via a secure link.

In the present example, the processor 25a also maintains and operates a security evaluation engine 35a to determine if the printing device is in a secure environment, such as when the printing device and the portable computing device 50 are connected via a known secure network.

In the present example, the processor 25a also maintains and operates an authentication engine 40a to determine authenticate a user on an unsecure printing device to provide for pull printing. For example, the authentication engine 40a may request some input from the user such a personal identification number, a username and password, an identification card, a badge, or a biometric scan via the portable computing device 50. The processor 25a may compare the input from the user with authentication information stored in the memory storage device, such as in the database 100a-2. Once the user has been authenticated, the print engine 30a releases and routes the print job from the queue 105a to the unsecure printing device, which may be outside of a secure network.

Figure 5:
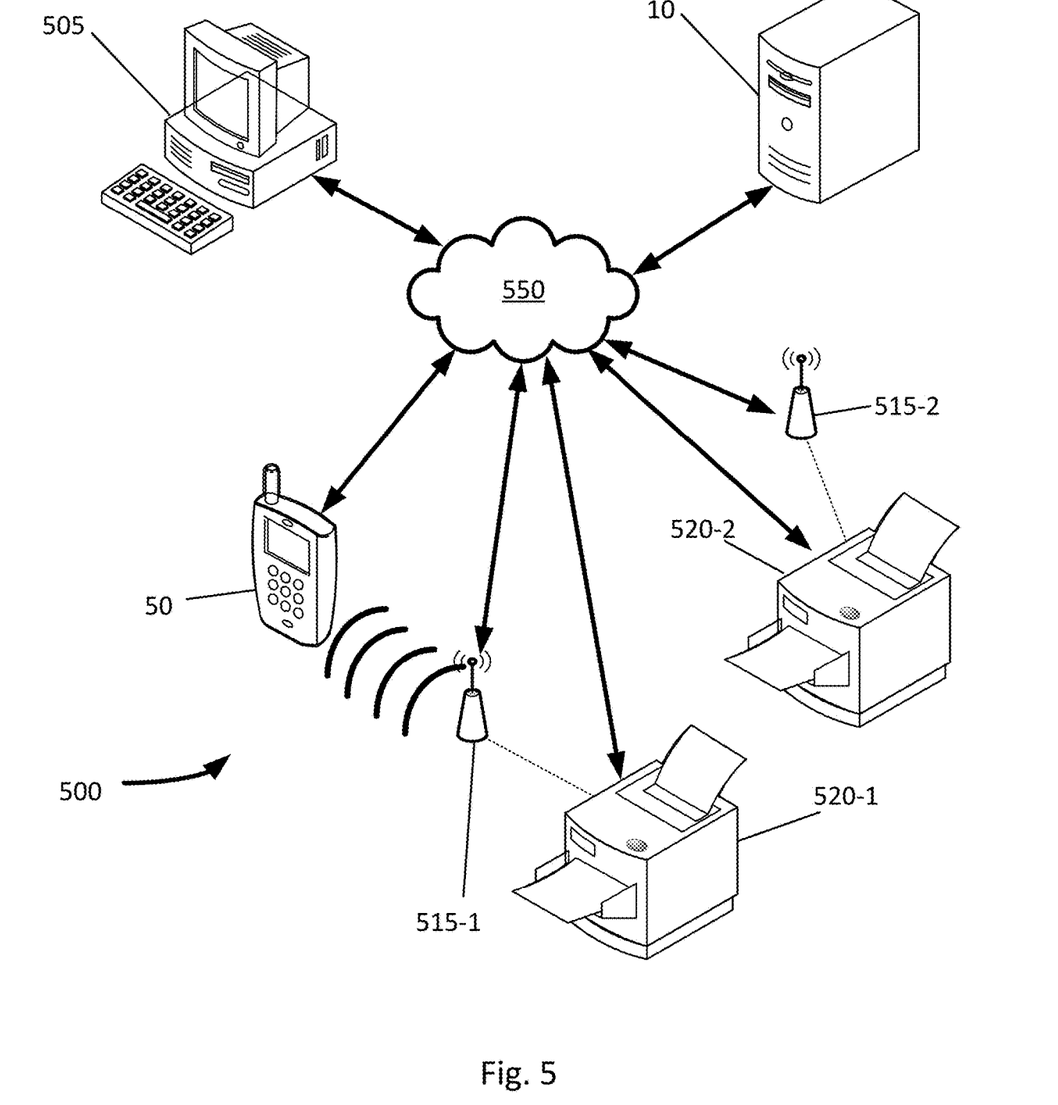
FIG. 5 is a schematic view of another implementation of the apparatus of FIG. 1.

Referring to FIG. 5, a schematic representation of a network system is generally shown at 500. The system 500 includes the apparatus 10, a computing device 505, such as a desktop computer, a portable computing device 50, such as a laptop, a smartphone, a smartwatch, a desktop computer, or a tablet, and beacons 515-1 and 515-2 located close to the printing devices 520-1 and 520-2, respectively. It is to be appreciated that in some examples, the printing devices 520 may include beacons 515 within built in. Accordingly, separate beacons 515 may not be used in such cases. In this example, the apparatus 10, the computing device 505, the portable computing device 50, and the beacons 515 are connected to the same network 550.

The network 550 in this example may be a local area network and may be wired, wireless, or a combination of wired and wireless. In the present example, the network 550 may be a secure network for providing a secure connection between devices connected to the network 550.

In operation, it may be assumed that a user of the computing device 505 send a print job to the apparatus 10 via the network 550 while the user is located near the computing device 505 to operate the computing device 505. In this example, the computing device 505 is beyond the threshold distance from any of the beacons 515. For example, the computing device 505 may be located on a different floor from the beacons 515. After sending the print job to the apparatus 10 from the computing device 505, the user may move toward the printing device 520-1 while carrying the portable computing device 50. Once the portable computing device 50 enters the range of the beacon 515-1, the apparatus 10 is notified and recognizes that the portable computing device 50 and the printing device 520-1 are in close proximity. Accordingly, the apparatus 10 sends the notification to the portable computing device 50 to prompt for a response to release the print job to the printing device 520-1. If the apparatus 10 received the command, the apparatus 10 sends the print job to the printing device 520-1 such that the generated documents will be available for pickup when the user associated with the portable computing device 50 arrives at the printing device 520-1.

It should be recognized that features and aspects of the various examples provided above may be combined into further examples that also fall within the scope of the present disclosure.

What is claimed is:

1. An apparatus comprising:
   a network interface to receive print data associated with a user from a first computing device and to receive context data from a second computing device, the second computing device associated with the user, and wherein context data includes a beacon identifier and a global positioning system (GPS) coordinate;
   a memory storage medium to store the print data, wherein the memory storage medium also includes a database of printing devices;
   a processor to select a printing device from the database of printing devices, the printing device associated with the beacon identifier and a predefined area, wherein the predefined area is defined by a geo-fence; and
   a print engine to generate a notification for the second computing device, wherein the notification prompts the user for a command to send the print data to the selected printing device, and wherein the notification is not generated in response to a prior command from the second computing device to the apparatus.

2. The apparatus of claim 1, wherein the processor aggregates a list of printing devices from the database of printing devices based on the context data.

3. The apparatus of claim 2, wherein the processor selects the printing device from the list of printing devices based on input received from the second computing device.

4. The apparatus of claim 1, wherein the processor is to determine whether the printing device, the first computing device, and the second computing device are connected via a local area network.

5. The apparatus of claim 4, wherein the processor is to determine whether the local area network is secure.

6. The apparatus of claim 5, wherein the GPS coordinate is to confirm a location of the second computing device.

7. The apparatus of claim 1, wherein the processor periodically polls the second computing device to obtain the context data.

8. A method comprising:
   receiving, via a network interface, a print job from a first computing device;
   receiving, via the network interface, location information from a second computing device, wherein the location information includes a beacon identifier and a global positioning system (GPS) coordinate;
   storing the print job in a memory storage medium, wherein the memory storage medium also includes a database of printing devices;
   selecting a printing device from the database of printing devices based on the location information received from the second computing device, wherein the printing device is located within a geo-fence;
   generating a notification for second computing device to prompt a user for a command to send the print job to the selected printing device, the notification not generated in response to a prior command from the second computing device;

receiving the command from the second computing device; and sending the print job to the selected printing device.

9. The method of claim 8, the first computing device and the second computing device are associated with the user.

10. The method of claim 8, comprising determining whether the printing device, the first computing device, and the second computing device are connected via a local area network.

11. The method of claim 8, wherein the second computing device sends the location information when the second computing device changes connection from a first network to a different second network.

12. The method of claim 8, wherein the location information includes a speed at which the user is moving toward the selected printing device, and wherein the sending occurs at a time such that printing of the print job is concluded when the user arrives at the selected printing device.

13. The method of claim 8, wherein the location information includes a direction in which the second computing device is moving, and wherein the selecting includes selecting a printing device along a route corresponding to the direction.

14. The method of claim 8, wherein a plurality of printing devices are located within the geo-fence, and wherein the selecting includes presenting a list of the plurality of printing devices to the second computing device and prompting the user to select one of the plurality as the selected printing device.

* * * * *